United States Patent [19]
Manaka

[11] Patent Number: 6,112,591
[45] Date of Patent: *Sep. 5, 2000

[54] FLOW SENSOR

[75] Inventor: Junji Manaka, Tokyo, Japan

[73] Assignee: Ricoh Elemex Corporation, Nagoya, Japan

[ * ] Notice: This patent is subject to a terminal disclaimer.

[21] Appl. No.: 09/210,924

[22] Filed: Dec. 14, 1998

Related U.S. Application Data

[62] Division of application No. 08/999,111, Dec. 29, 1997, which is a division of application No. 08/603,118, Feb. 16, 1996, Pat. No. 5,722,288, which is a division of application No. 08/342,579, Nov. 21, 1994, Pat. No. 5,726,357, which is a division of application No. 08/702,779, Aug. 23, 1996, Pat. No. 5,780,393.

[51] Int. Cl.⁷ ........................................................ G01F 1/68
[52] U.S. Cl. ................................................... 73/204.26
[58] Field of Search .......................................... 73/204.26

[56] References Cited

U.S. PATENT DOCUMENTS

| | | |
|---|---|---|
| 4,478,076 | 10/1984 | Bohrer . |
| 4,478,077 | 10/1984 | Bohrer et al. . |
| 4,909,078 | 3/1990 | Sittler et al. . |
| 5,392,647 | 2/1995 | Manaka . |
| 5,423,212 | 6/1995 | Manaka . |
| 5,452,610 | 9/1995 | Kleinhans et al. . |
| 5,576,488 | 11/1996 | Sheplak et al. . |
| 5,722,288 | 3/1998 | Manaka .............................. 73/204.26 |
| 5,726,357 | 3/1998 | Manaka . |

*Primary Examiner*—Harshad Patel
*Assistant Examiner*—Jewel V. Thompson
*Attorney, Agent, or Firm*—Cooper & Dunham LLP

[57] ABSTRACT

Disclosed is a flow sensor for sensing heat transfer with a high-speed response, which is manufactured by applying IC micro-machining technology, and which attains an improved heat transfer efficiency by controlling the flow's direction between a heating portion and a sensing portion or by utilizing the intrinsic characteristics of the gas flow.

A flow sensor having a substrate whereon a heating portion and a sensing portion are formed each in the form of a bridge supported at both ends or at one end in said order in the direction of the flowing gas to be measured, and which is placed, its surface with the elements down, at the upper inside wall of a pipe for gas to be measured. Its output signal is taken out through lead wires.

6 Claims, 15 Drawing Sheets

FIG.20
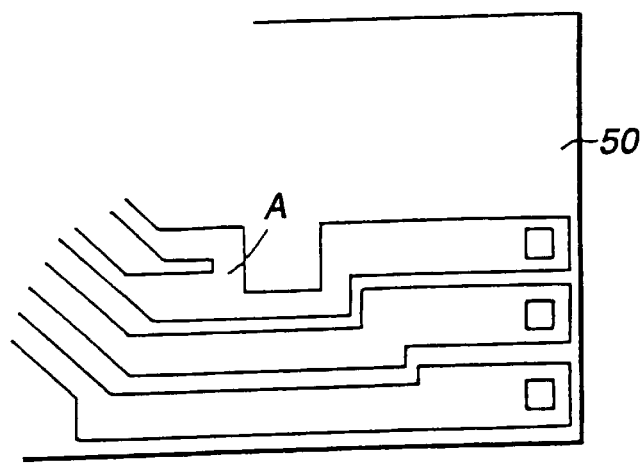
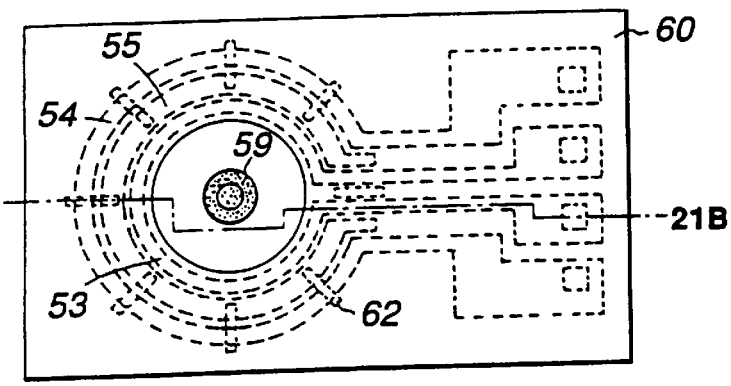
FIG.21(a)
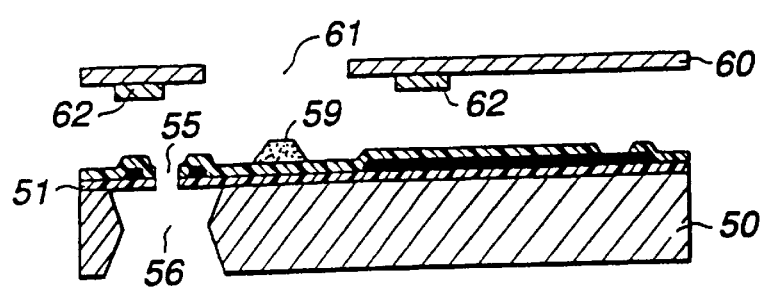
FIG.21(b)

FIG.22
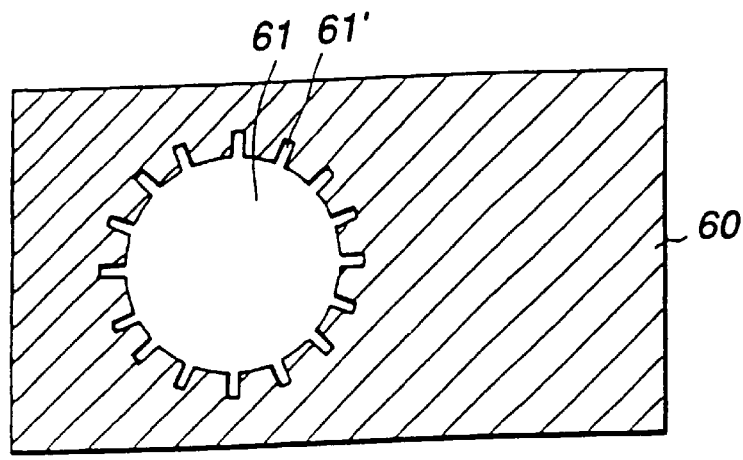
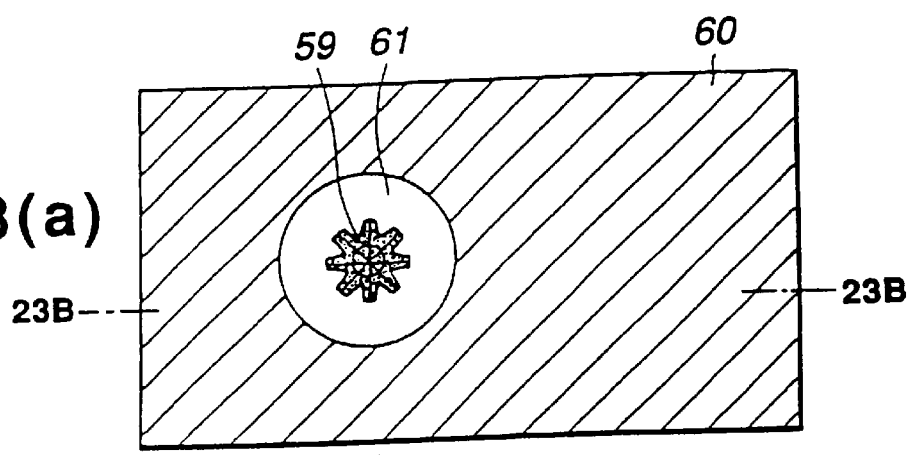
FIG.23(a)
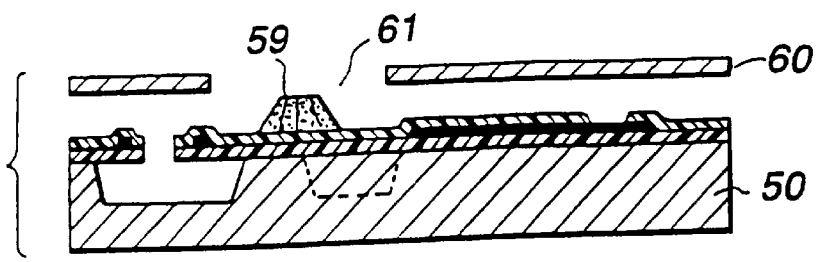
FIG.23(b)

FLOW SENSOR

This is a divisional of application Ser. No. 08/999,111 filed Dec. 29, 1997 which is a divisional of application Ser. No. 08/603,118, filed Feb. 16, 1996 now U.S. Pat. No. 5,722,288, which is a divisional of application Ser. No. 08/342,579, filed Nov. 21, 1994 now U.S. Pat. No. 5,726,357 which is a divisional of application Ser. No. 08/702,779 filed Aug. 23, 1996 now U.S. Pat. No. 5,392,647.

BACKGROUND OF THE INVENTION

The present invention relates to a flow sensor and more particularly to a heat transfer detection type flow sensor comprising a heating portion and a heat receiving portion (sensing portion).

Such a thermal-type flow sensor that comprises a substrate is known where on a heating element and a heat-receiving element are disposed at the upstream side and at the downstream side, respectively, in the direction of the gas flow to be measured. When gas flows along the substrate, it is heated by the heating element at the upstream side and then the heat is transferred to the heat receiving element at the downstream side on the substrate. Since the quantity of the transferred heat is proportional to the gas flow, the flow sensor can determine the amount of the gas flow.

However, in the application of the above-mentioned conventional type flow sensor, the following problems arise.

A divided flow of gas moving along the surface of the substrate, as compared with a divided flow of gas moving above the surface thereof may have decreased flow and a decreased rate of flow consequently has a low efficiency of heat transfer because of the effect of fluid viscosity and contact resistance at the boundary's surface.

On the other hand, the divided flow of gas moving above the substrate surface contributes to the flow's measurement by taking heat from the heating element and giving heat to the heat-receiving element, but it can't sufficiently transfer the heat from the heating element to the heat-receiving element because of the heat's dissipation during its movement between the elements. This divided flow has also a low efficiency in heat transfer.

Furthermore, since the heating element and the heat-receiving element are resisting the gas flow, the divided flow, apart from the substrate surface, is apt to disappear from the substrate surface. When the substrate surface is placed right-side up,there is less heat from the heating element transferred to the heat-receiving element owing to the heat's dissipation by convection (the upward movement of the gas). This may cause a decrease in the heat's transfer efficiency.

SUMMARY OF THE INVENTION

It is therefore an object of the present invention to provide a high-response, heat-transfer detection type flow sensor which is manufactured by utilizing micro-machining technology for IC production and which has an improved efficiency of heat transfer from a heating element to a heat receiving(sensing) element by controlling the direction of the flow of the gas between the elements or by utilizing the characteristics of the fluid's flow therein.

Another object of the present invention is to provide a flow sensor which has an improved efficiency of heat transfer from a heating element to a heat-receiving element by disposing the heating and the heat-receiving elements under the substrate so as not to allow the dissipation of heat from the heating element by convection (the ascending flow of gas).

Another object of the present invention is to provide a flow sensor having an improved efficiency of heat transfer with a uniform gas flow rate, wherein an open outlet portion of a gas flow passage is formed to expand forward and be shortened at both side walls in order to reduce the resistance of the passage against the gas flow along the side walls of the open-outlet portion at a lower speed than that of the gas flow along the passage's center line.

Another object of the present invention is to provide a flow sensor having an improved efficiency of heat transfer, wherein a heat receiving element is disposed near an open outlet portion of a gas flow passage to prevent the gas stream above a heat receiving element from going up.

Another object of the present invention is to provide a flow sensor wherein a flow-rectifying plate is provided at the outlet of a gas flow passage to stabilize the gas stream along the end of a substrate at the outlet side.

Another object of the present invention is to provide a flow sensor wherein a heating portion and a heat- receiving portion are formed as coaxial rings to improve the efficiency of the heat's transfer between them.

Another object of the present invention is to provide a flow sensor wherein a flow-rectifying plate is provided for obtaining a uniform gas flow along the heating portion and the heat- receiving portion, and thereby increasing the efficiency of the heat's transfer between them.

BRIEF DESCRIPTION OF DRAWINGS

FIGS. 5(a) and 2(b) are views for explaining a part of the process for manufacturing a flow sensor according to the present invention.

FIG. 20 is a view for explaining an example of a method for commonly using a part of an electrode portion.

FIGS. 21(*a*) and 21(*b*) are construction views of another embodiment of the present invention.

FIG. 22 is a plane view showing a modification of a throttling plate 60.

FIGS. 23(*a*) and 23(*b*) are views showing a modification of the flow-rectifying element shown in FIG. 21.

DESCRIPTION OF THE PREFERRED EMBODIMENTS

Figure 1:
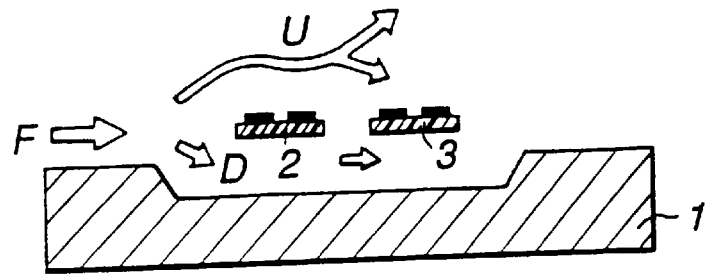
FIG. 1 is a sectional view showing the main part of a conventional flow sensor.

FIG. 1 is a sectional view showing the essence of the construction of a conventional heat-transfer detection type flow sensor which comprises a substrate 1, a heating element 2 and a heat-receiving element 3. As is well known, the heating element 2 and heat-receiving element 3 are disposed at the upstream and downstream sides, respectively, of the substrate 1 in the direction of flow of the gas F to be measured. When the gas F flows in the indicated direction, it transfers heat-generated by the heating element 2 to the heat receiving element 3. Since the quantity of transferred heat is proportional to the gas's flow, the sensor may determine the rate of flow of the gas. However, a divided flow D of gas F along the surface of the substrate 1 in comparison with a divided flow U of gas apart from the surface of the substrate 1 may flow at a lower speed and a rate smaller of flow due to the effect of the gas's viscosity and contact resistance at the boundary's surface. Therefore, the efficiency of heat transfer by the divided flow D will be low.

On the other hand, the divided flow U of the gas F moving above the substrate surface 1 contributes to the flow's measurement by taking heat from the heating element 2 and giving heat to the heat-receiving element 3, but it can't sufficiently transfer the heat from the heating element 2 to the heat receiving element 3 because of the heat's dissipation during the travel of the gas at a distance there between. This divided flow U has also a low efficiency of heat transfer.

Furthermore, since the heating element 2 and the heat receiving element 3 are resistant to the gas's flow, the divided flow U is apt to go away from the heat receiving element 3. If the substrate 1 is placed "surface up" as shown in FIG. 1, the flow of gas heated by the heating element 2 ascends by convection and, therefore, does not approach the heat-receiving element 3.

As mentioned above, the conventional flow sensor has a constructional drawback that causes low efficiency of heat transfer therein.

In view of the foregoing, the present invention was made to provide a high-response, heat-transfer, detection type flow sensor which is manufactured by utilizing micro-machining technology of IC production and which has an improved efficiency of heat transfer from a heating element to a heat receiving (sensing) element by controlling the direction of the gas flow between the elements or by utilizing the flow characteristics of gas.

Figure 2A:
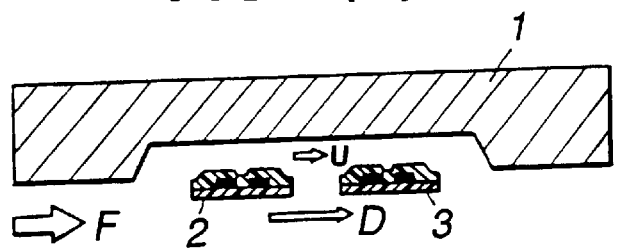
FIGS. 2(a),2(b) and 2(c) are views for explaining a flow sensor embodied in the present invention.
Figure 2B:
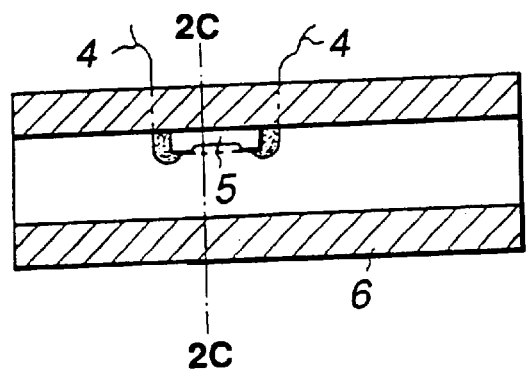
Figure 2C:
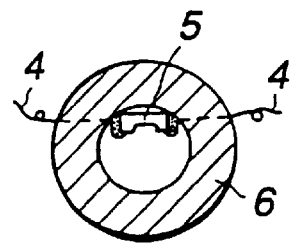

Referring to FIGS. 2(*a*), 2(*b*) and 2(*c*), there is shown a flow sensor embodying the present invention. FIG. 2(*a*) is a sectional view of the essence of the flow sensor, FIG. 2(*b*) is a sectional view of the flow sensor mounted in gas flow piping and FIG. 2(*c*) is a sectional view taken along line 2C—2C of FIG. 2(*b*). These drawings show the flow sensor 5 comprising a substrate 1, a heating element (heater) 2 and a heat receiving (sensing) element 3. Numerals 4 and 6 designate, respectively, a lead wire of the flow sensor 5 and a pipe along which gas flows. As well known, the flow sensor measures the flow F of gas along the pipe 6 in such a way that heat generated by the heating element 2 and diffused in the gas flow is detected by the heat receiving element 3.

In the embodiment shown of the present invention, substrate 1 is place side down (in the direction of gravity) to be located above the heating element 2 and the heat receiving element 3, thereby heat from the heating element 2 can't be taken away by convection (upward stream) and the efficiency of heat transfer is greatly improved in comparison with a conventional sensor.

In FIGS. 2 (*b*) and 2 (*c*), there is illustrated the flow sensor 5 mounted in a pipe 6 wherein gas flows.

Figure 3:
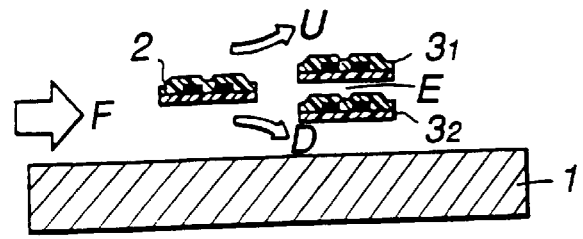
FIG. 3 is a construction view of another embodiment of the present invention.

FIG. 3 is a construction view of another embodiment of the present invention. A flow sensor comprises a substrate 1, a heating element 2 and heat receiving (sensing) elements $3_1$ and $3_2$ which are disposed in two (upper and lower) layers in different horizontal planes relative to the heating element 2 as shown in FIG. 3. Such an arrangement makes it possible to effectively transfer heat from the heating element 2 to the heat receiving elements even if the heat is diffused by the flow of gas to be measured. The flowing gas F is heated when coming in contact with the heating element 2 and then is divided into two flows U and D which may make contact with the heat-receiving elements $3_1$ and $3_2$ disposed in two layers at an adequate distance from each other. Consequently, the heat receiving elements may effectively receive the diffused heat from the heating element 2.

Figure 4:
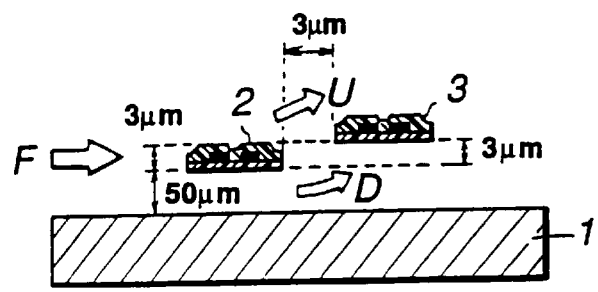
FIG. 4 is a construction view of another embodiment of the present invention.

FIG. 4 is a construction view of a further embodiment of the present invention, wherein a heating element 2 and heat-receiving (sensing) element 3 are arranged at different levels, i.e., the latter being disposed higher than the other. This embodiment may have an improved heat transfer efficiency in comparison with the conventional flow sensor. In the shown case, a divided flow D is apt to go away from the substrate 1 owing to contact resistance produced at the boundary thereof. Therefore, it is possible to improve the heat transfer efficiency by placing the heat receiving element 3 at the junction of the two divided flows U and D.

If the heating element 2 and the heat receiving element 3 are of 0,5 to 20 microns in thickness and the heat receiving element 3 is separated from the substrate 1 more than from the heating element 2 by a distance of 1 to 50 microns, it will be very desirable to arrange the elements, for example, as shown in FIG. 4, i.e., the heating element 2 and the heat-receiving element 3 are spaced from each other by 3 microns both in vertical and horizontal directions and the heating element 2 is located apart from the substrate 1 at a distance of 50 microns.

Figure 5A:
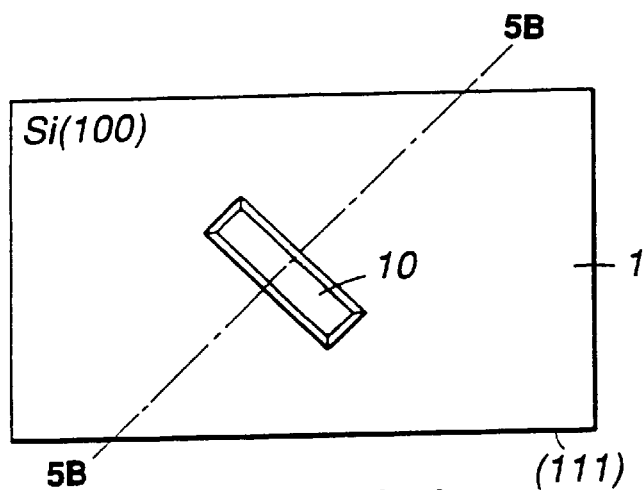
Figure 5B:
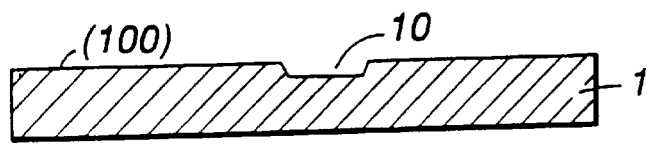

The method for manufacturing the flow sensor shown in FIG. 3 will be described as follows:

FIG. 5(*a*) is a plane view and FIG. 5(*b*) is a sectional view taken on line 5B—5B. A silicon (100) substrate 1 is prepared by the known technology of micro-machining semiconductor ICs and a silicon oxide is formed thereon by thermal oxidation. Then a concave shape 10 is formed by photo-etching the oxide film or it may be directly formed (without forming an oxide film) by plasma-etching through a photo-resisting mask. As shown in FIGS. 5(a) and 5(b), the concave 10 is rectangular and must be arranged so as not to be parallel on any side to the plane 111 of the substrate. It may be of 3 to 50 microns in depth.

Figure 6A:
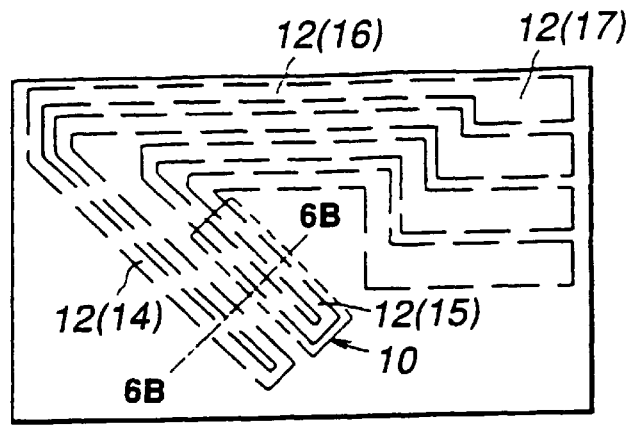
FIGS. 6(a) and 6(b) are views for explaining a part of the process for manufacturing a flow sensor according to the present invention.
Figure 6B:
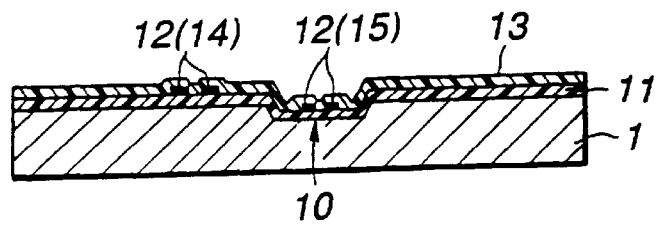

FIGS. 6(a) and 6(b) illustrate an insulating layer 11, a heat-resistanting layer 12 and an insulating layer 13 successively placed on the substrate shown in FIGS. 5(a) and 5(b). FIG. 6(a) is a plane view and FIG. 6(b) is a sectional view taken on line 6B—6B of FIG. 6(a). The heat-resisting layer 12 is formed by using the known pattern etching technology. The etched pattern consists of a heating portion 14, a heat receiving (sensing) portion 15, a wiring portion 16 and an electrode portion 17.

Figure 7A:
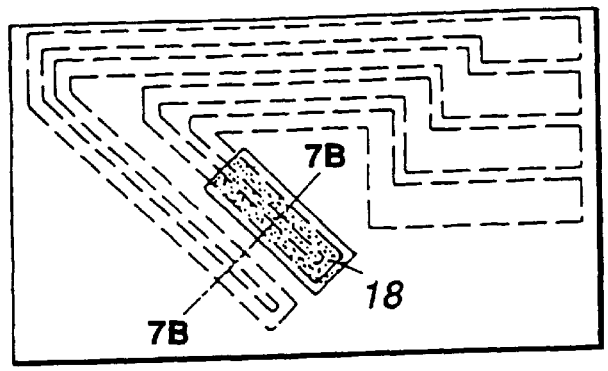
FIGS. 7(a) and 7(b) are views for explaining a part of the process for manufacturing a flow sensor according to the present invention.
Figure 7B:
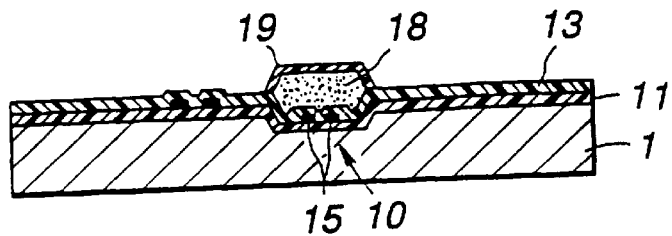

FIGS. 7(a) and 7(b) are views for explaining a process for forming a spacing layer E shown in FIG. 3 on a substrate's portion corresponding to the concave 10 shown in FIG. 6(a) and 6(b). A spacing layer is formed over the heat receiving (sensing) portion 15 and a spacing pattern 18 is formed thereon by a photoetching process. This pattern 18 is of 3 to 50 microns in thickness and must be made of material selectively removable by elution in a subsequent process. An insulating layer 19 for providing the heat receiving element is further depositted over the pattern 18.

Figure 8A:
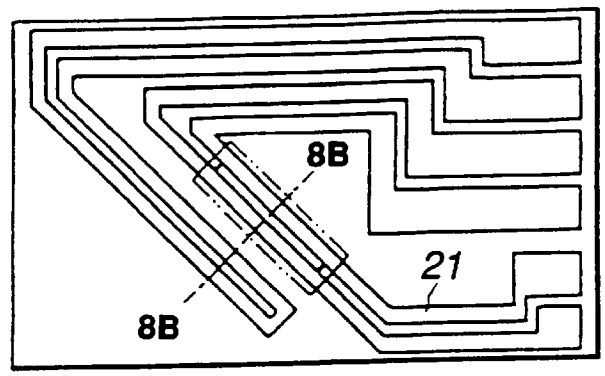
FIGS. 8(a) and 8(b) are views for explaining a part of the process for manufacturing a flow sensor according to the present invention.
Figure 8B:
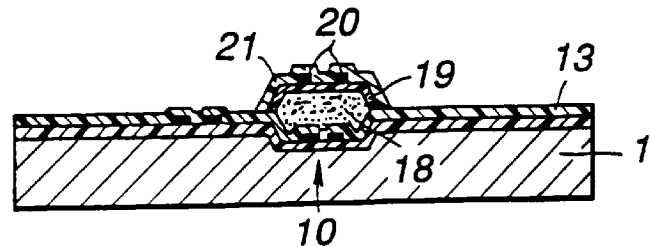

FIGS. 8(a) and 8(b) illustrate the pattern of a heat-resisting layer 20, which is formed on the insulating layer 19 by a like method for forming a similar layer 12 as shown in FIGS. 6(a) and 6(b), and an insulating layer 21 formed thereon. FIG. 8(a) is a plane view and FIG. 8(b) is a section taken on line 8B—8B of FIG. 8(a).

Figure 9A:
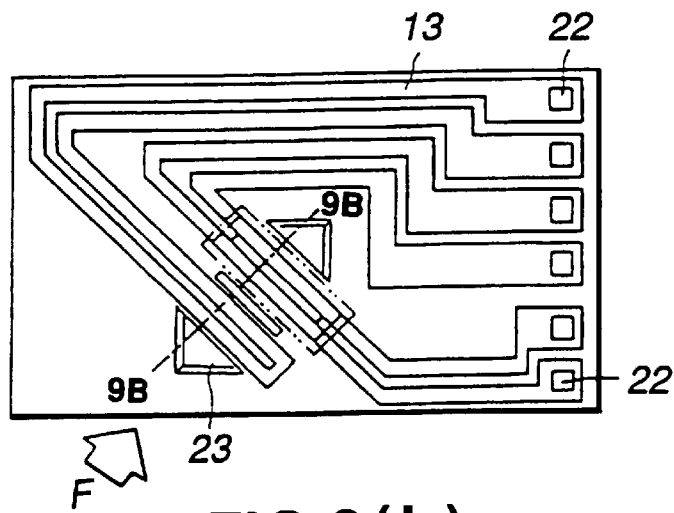
FIGS. 9(a) and 9(b) are views for explaining a part of the process for manufacturing a flow sensor according to the present invention.
Figure 9B:
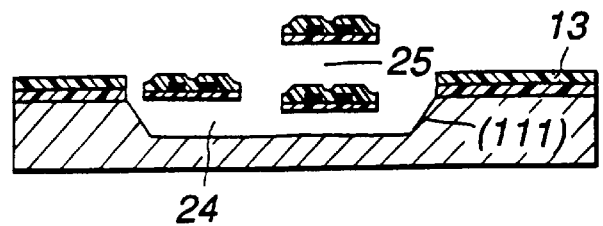

FIGS. 9(a) and 9(b) show open electrode portions 22 and an open Si-portion 23 formed by photoetching and plasma etching, from the upper side, insulating layers 21, 19, 13 and 11 shown in FIGS. 8(a) and 8(b). By doing so, there is formed an open area 23 of Si-substrate. A cavity 24 is formed by the use of an alkaline anisotropic etching solution. Before or after this, a spacing layer 18 shown in FIGS. 8(a) and 8(b) is removed by side-etching from the portion wherefrom the insulating layers were previously removed. As is apparent from FIG. 9(b) showing a section taken on line 9B—9B of FIG. 9(a), there is formed a spacing layer 25 corresponding to the spacing layer E shown in FIG. 3. In this case the gas to be measured flows in the direction shown by an arrow F, which corresponds to the direction F shown in FIG. 3.

To manufacture a flow sensor of the type shown in FIG. 4, the process shown in FIGS. 6(a) and 6(b) shall be followed by the process shown in FIGS. 9(a) and 9(b). However, in this case the direction of the gas flow is reversed to the flow's direction F shown in FIG. 9(a).

Figure 10A:
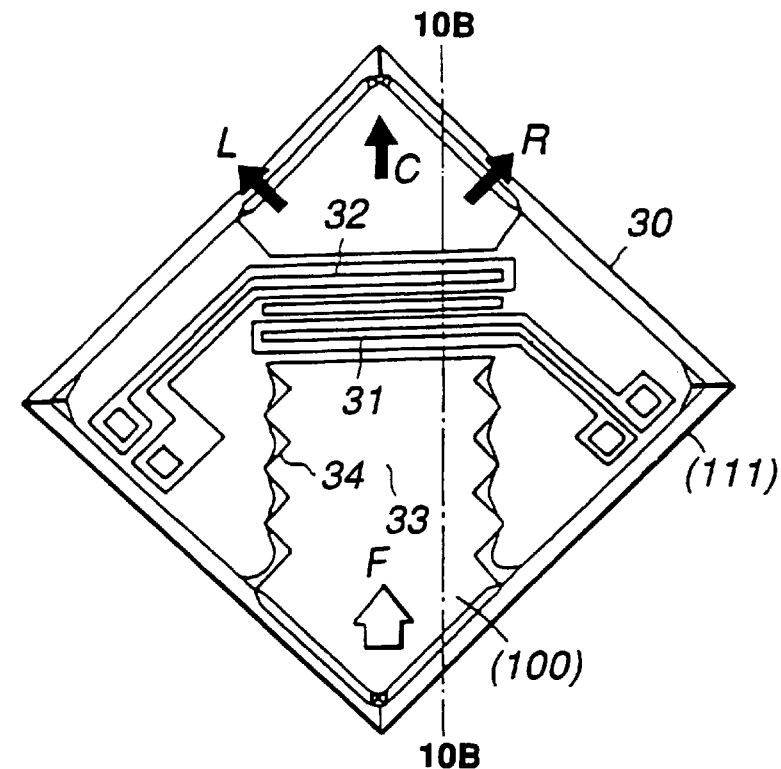
FIGS. 10(a) and 10(b) are construction views of another embodiment of the present invention.
Figure 10B:
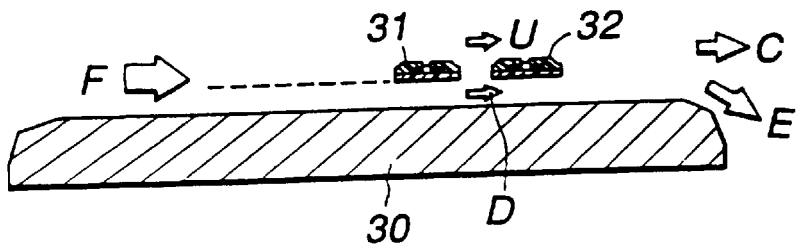

FIGS. 10(a) and 10(b) are views for explaining another embodiment of the present invention. FIG. 10(a) is a plane view and FIG. 10(b) is a sectional view taken along line 10B—10B of FIG. 10(a). There are shown a silicon substrate 30, a heating element 31, a heat receiving (sensing) element 32, a gas passage way and a wall 34 of the passage.

In this embodiment, the heating portion 31 and the heat-receiving portion 32 are bridged over the fluid passage 33 formed in the silicon (100) substrate 30. The heating element 31 and the heat receiving element 32 are disposed at an edge of the substrate 30 to obtain a uniform transfer of heat by utilizing the movement for gas toward the substrate.

When the fluid flows along the heating element 31 and the heat-receiving element 32, it is divided into two streams U (above elements) and D (under elements) as shown in FIG. 10(b). As previously described in a conventional sensor, the divided flow D is larger than the divided flow U.

As previously mentioned, the divided flow of gas U is apt to go away from the heat-receiving element. However, in the case of the heat receiving element being located near an end-face of portion the substrate at a distance of, for example, 5 mm or less, the whole gas flow will be attracted downward along the end face of the substrate, therefore the divided flow U may some close approach to the heat-receiving element. This increases the heat transfer efficiency of the sensor.

An open ended portion of the walled gas passage is formed to expand forward and both corner paths of the divided flows L and R are made shorter than a central path would be for a center divided flow C to make the wall's resistance to the flow of gas well balanced for uniformly distributing the flow. This may further improve the heat transfer efficiency of the sensor.

Figure 11:
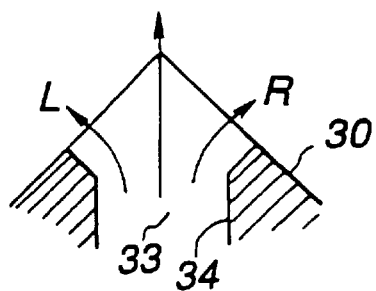
FIG. 11 is a plane view for explaining the function of an outlet portion shown in FIG. 10.

FIG. 11 is a plane view of an outlet portion of the passage 33 of gas. Since the open outlet portion of the passage wall 34 is expanding forward, gas flowing along the corner paths L and R may have smaller flow resistance because of the short distance to the end face of the substrate 30 in comparison with gas flowing along a center path which may have a larger flow resistance due to the large distance to the end-face of the substrate 30. Such a design of the outlet portion may attain a substantially uniform distribution of the fluxes of gas flowing along the passage 33.

Figure 12:
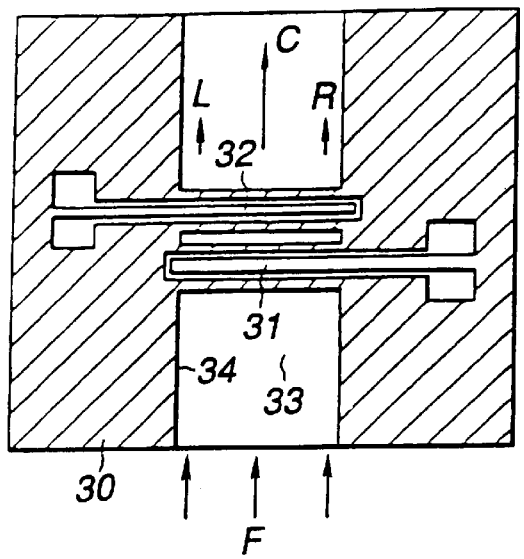
FIG. 12 is a view showing an example of a conventional sensor.

FIG. 12 is the view of a conventional sensor which has a straight (not expanded) outlet for a gas passage 33. In this case, even if the uniform flow F of gas enters into the passage, the flow may mostly concentrate at the center line C when passing a heating element 31 and a heat-receiving (sensing) element 32, causing reduced flows of L and R along the side wall's of the passage due to the wall resistance. Consequently, only the center portion of the gas flow contributes to the transfer of heat from the heating element 31 to the heat receiving element 32, resulting in obtaining few detection signals for a whole output. Accordingly, the detection sensitivity is low and noise separation is also make difficult.

Figure 13A:
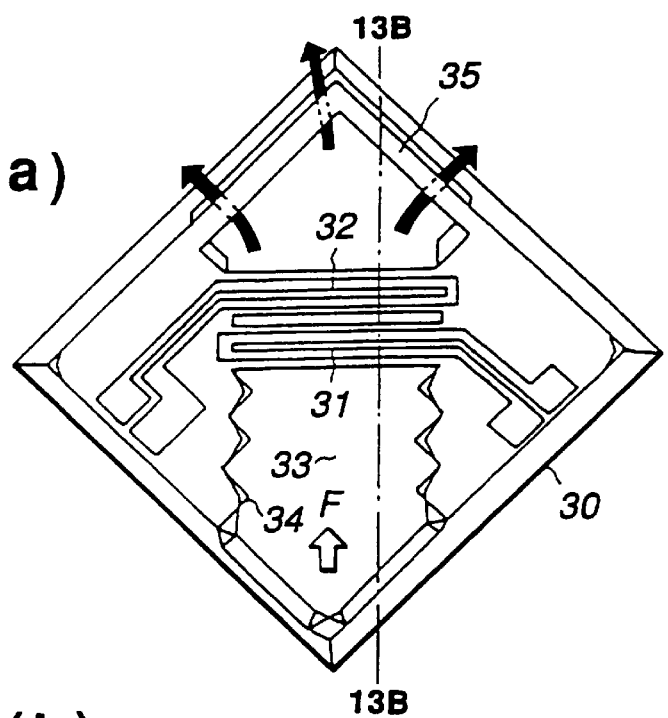
FIGS. 13(a) and 13(b) are construction views of another embodiment of the present invention.
Figure 13B:
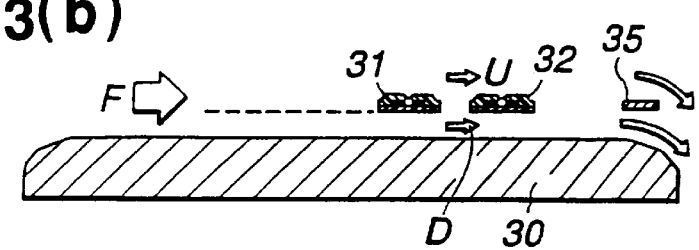

FIGS. 13(a) and 13(b) are views for explaining another embodiment of the present invention. FIG. 13(a) is a plan view and FIG. 13(b) is a sectional view taken along line 13B—13B of FIG. 13(a). Components similar in function to those of the embodiment shown in FIGS. 10(a) and 10(b) are designated by the same reference numbers. In this embodiment, a substrate 30 is provided near its corner edge with a flow-rectifying plate 35 projecting thereto or bridged thereon to stabilize the gas flow along the end-portion of the substrate. This flow rectifying plate 35 must be mounted at the end portion of the substrate, otherwise it is of no use.

Figure 14A:
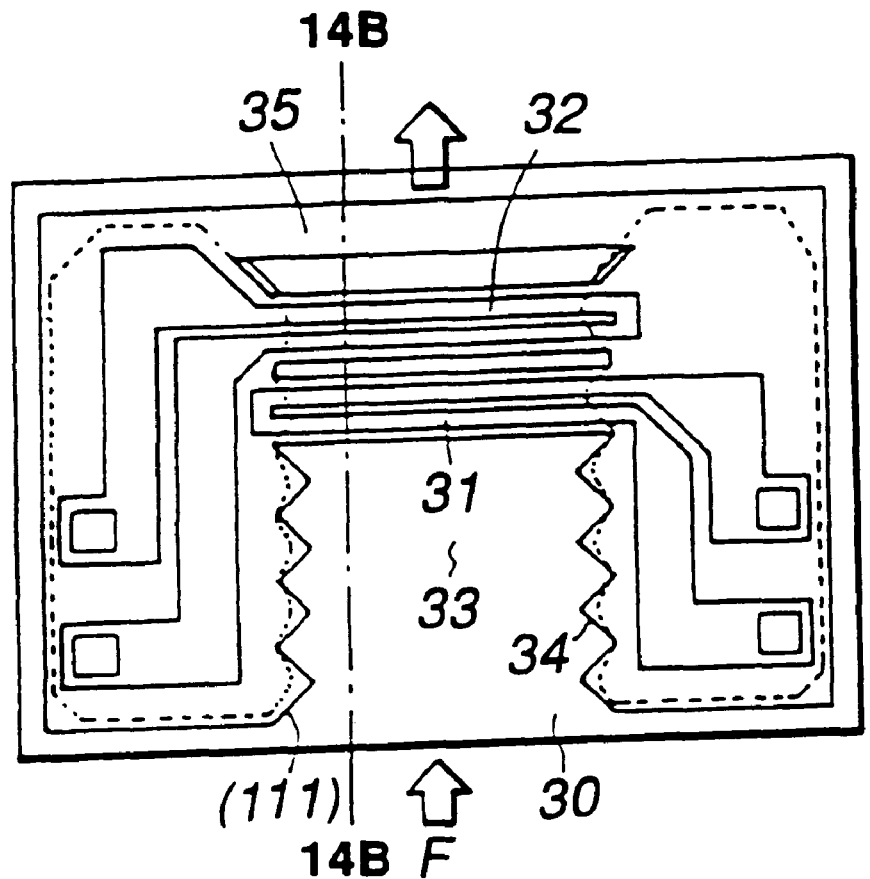
FIGS. 14(a) and 14(b) are construction views of another embodiment of the present invention.
Figure 14B:
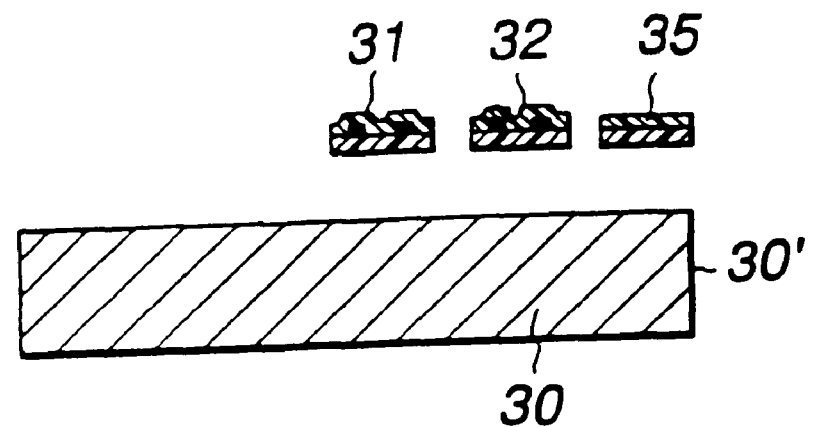

FIGS. 14(a) and 14(b) are views for explaining another embodiment of the present invention. FIG. 14(a) is a plane view and FIG. 14(b) is a sectional view taken along line 14B—14B of FIG. 14(a). Components similar in function to those of the embodiment shown in FIGS. 13(a) and 13(b) are designated by the same reference numbers. In this embodiment, a substrate 30 is a silicon wafer <Si(100)> whereon a passage 33 is formed at high accuracy of its width between side walls 34 in the following manner: A saw-tooth profile of each side wall is precisely patterned on an insulating layer, keeping each front face (of the profile) parallel to the basic plane (111) and each back faces at a right angle thereto, then the silicon substrate is etched according to the pattern by an anisotropic etching method to form the message 33 thereon.

A flow rectifying plate 35 in the form of a bridge is formed at the same insulating layer where a heating element 31 and a heat-receiving (sensing) element 32 are formed so as to align it with the elements at about the same plane. This flow rectifying plate 35 shall be located at the edge 30' of the substrate 30 or be projected beyond said edge. The plate 35 across the flow of gas shall be i,e, wide not less than that of the heating element 31 and the heat-receiving element 32 to exert the intended effect to rectify the gas flow. If there is no rectifying plate, the gas, having passed over the edge of the substrate, runs around the sides of the substrate to form thereat vortexes that may grow to unstable vortex currents as the flow increases and effects heat transferring from the heating element to the heat-receiving element. The accurate measurement of the flow therefore can not be performed.

Figure 15A:
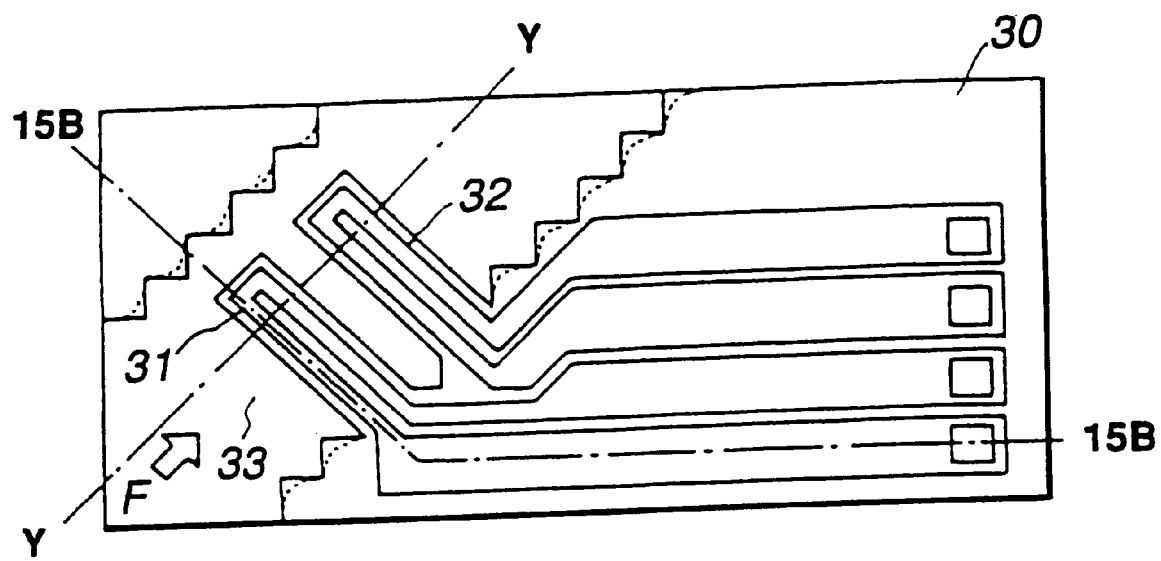
FIGS. 15(a) and 15(b) are views showing a flow sensor having a cantilever sensing portion according to the present invention.
Figure 15B:
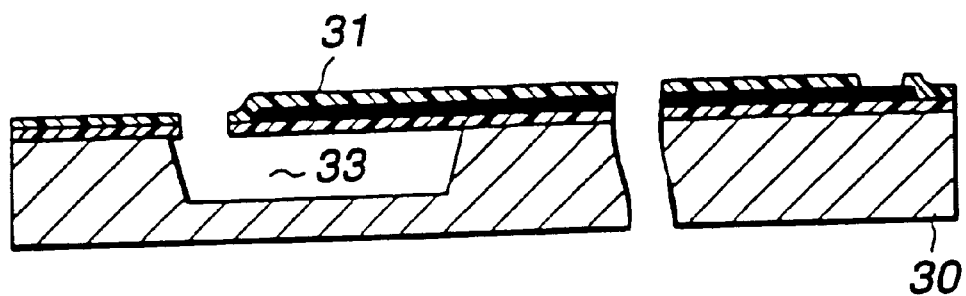

FIGS. 15(a) and 15(b) are views for explaining another embodiment of the present invention. FIG. 15(a) is a plane view and FIG. 15(b) is a sectional view taken along line 15B—15B of FIG. 15(a). In this embodiment, a heating element 31 and a heat receiving (sensing) element 32 are formed each in the form of a cantilevered bridge across the passage 33 on the substrate 30. The heat-receiving element 32 is arranged at a higher level than the heating element 31, for example, as shown in FIG. 4 if viewed from the direction Y—Y of FIG. 15(a).

Figure 16A:
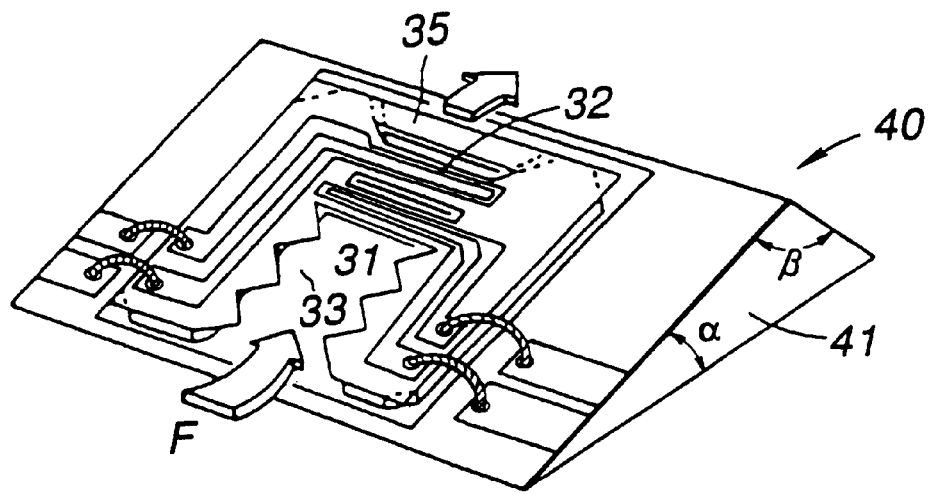
FIGS. 16(*a*), 16(*b*) and 16(*c*) are views for explaining an example of the application of a flow sensor.
Figure 16B:
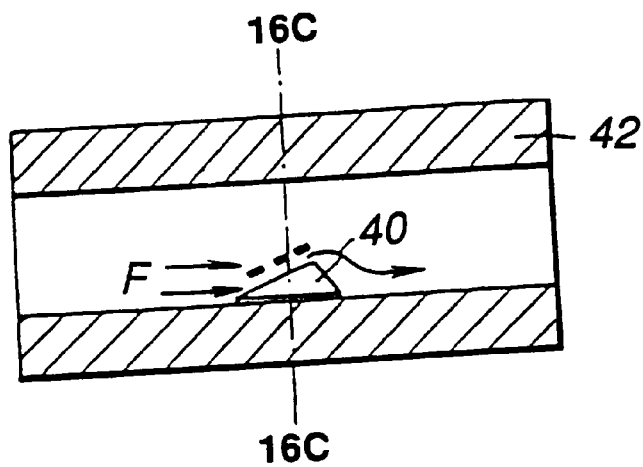
Figure 16C:
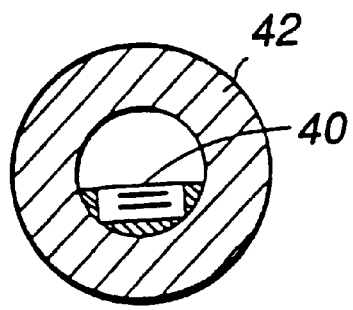

FIGS. 16(a), 16(b) and 16(c) are views for explaining an example of how to use a flow sensor thus manufactured. FIG. 16(a) shows, in perspective, the sensor mounted on a wedge-shaped stand 41, FIG. 16(b) is a sectional view of a pipe 42 whereon the stand 41 with the sensor secured thereto is mounted, and FIG. 16(c) is a sectional view taken on line 16C—16C of FIG. 16(b). In FIG. 16(a), the whole structure of the flow sensor, integrally secured to the stand, is illustrated with the reference numeral 40. A wedge-shaped stand is desired in order to have an angle α of 1~40° at the inlet side and an angle β of 60~179° at the outlet side of the pipe. Mounting the sensor on the stand 41 eliminates the possibility of vortexes occurring when gas is passing the flow sensor transferring the heat from the heating element 31 to the heat-receiving (sensing) element 32.

Figure 17A:
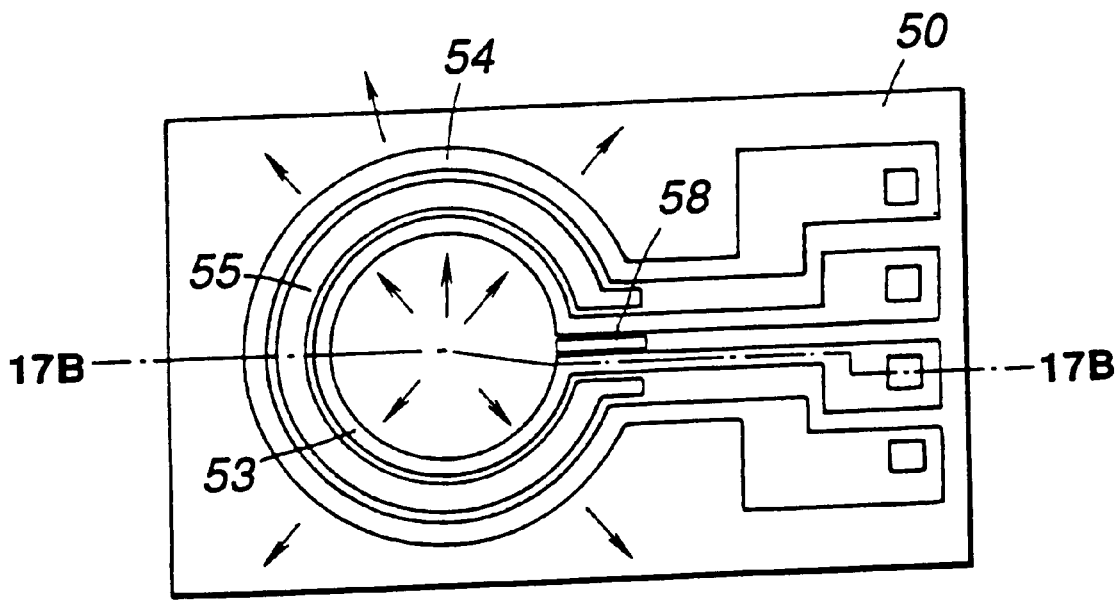
FIGS. 17(*a*), 17(*b*) and 17(*c*) are construction views of another embodiment of the present invention.
Figure 17B:
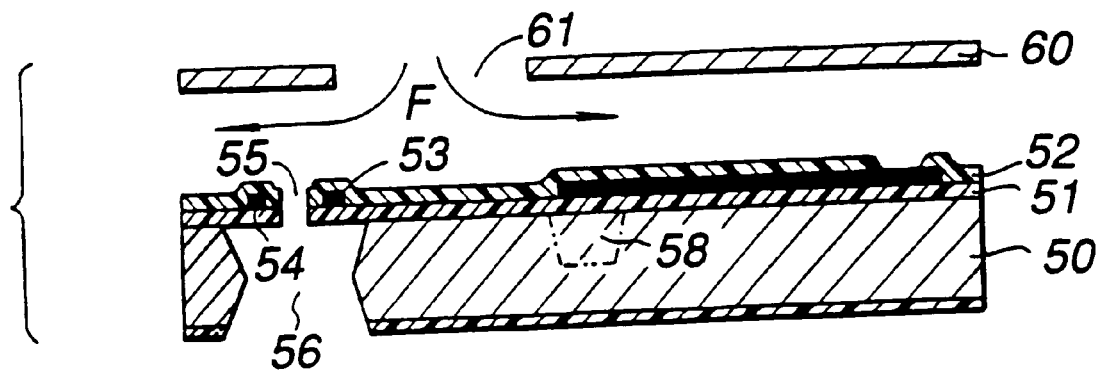
Figure 17C:
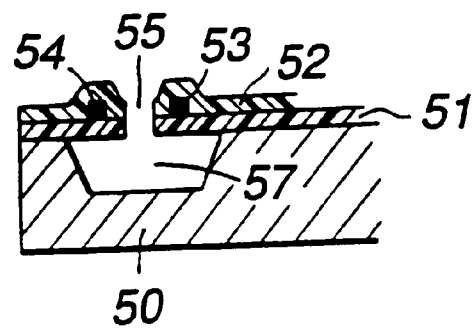

FIGS. 17(a), 17(b) and 17(c) are views for explaining another embodiment of the present invention. FIG. 17(a) is a plane view, FIG. 17(b) is a sectional view taken on line 17B—17B of FIG. 17(a). FIG. 17(c) is a view of a modification of the embodiment shown in FIG. 17(b).

In these drawings, numeral 50 designates a substrate made of a material such as Cu, Ni, Cr, Si, stainless steel, copal (polystyrene), polyimid and so on, numerals 51 and 52 designate insulating layers made of a heat-resisting material such as MgO, $SiO_2$, $Ta_2O_5$, $Si_3N_4$, $Al_2O_3$ and so on, and numerals 53 and 54 designate a heating layer and a heat-receiving (sensing) layer, respectively, made of material for resisting heating such as Pt, NaCr, W, SiC, Kanthal and so on. In this embodiment, the heating layer 53 and the heat-receiving layer 54 are rings arranged concentrically with each other and at a gap of 55 therebetween.

They are both projecting over a through hole 56 (FIG. 17(b)) or a cavity 57 (FIG. 17(c)) formed on the substrate.

The embodiment is intended to improve the efficiency of heat transfer by diffusing heat from the heating element (inner ring) in a radial, peripheral direction, and transferring it to the heat-receiving element (outer ring). When the flow sensor of this embodiment is located in a pipe in such a way that gas F flows in a perpendicular direction to the sensor's surface or passes through a hole 61 of a throttling plate 60 and enters at approximately the center of concentric rings, the gas flow is evenly distributed toward the outside of the rings to evenly transfer heat from the heating element 53 to the entire ring's surface of the heat receiving element 54. Consequently, sensor can effectively sense the gas's flow. While FIG. 17 shows the single-ring type elements 53 and 54, they may be of a multi-ringed type or be formed into a rectangle or in a curved shape. The reverse direction of the flow of gas is also possible. A hole 58 provided at the neck portion of the ring-shaped heating element 53 makes it easier to etch the neck portion by allowing an etching solution therethrough.

Figure 18:
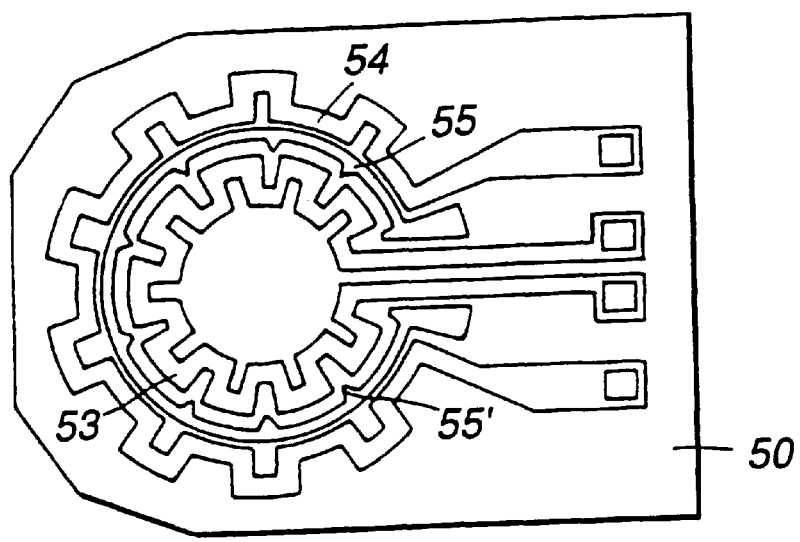
FIG. 18 is a construction plane view for explaining a modification of the embodiment shown in FIG. 17.

FIG. 18 is a plane view for explaining a modification of the embodiment shown in FIGS. 17(a), 17(b) and 17(c). In this modified embodiment, a heating layer 53 and a heat-receiving layer 54 are formed each in a film of a zigzag pattern that is more effective for generating heat and to absorb it, and further it improves the sensitivity and resolution of the flow's sensor. As shown in FIG. 18, the provision of notches 55' in a cavity 55 can increase the heat transferring efficiency of the sensor by preventing an excessive increase of temperature.

Figure 19:
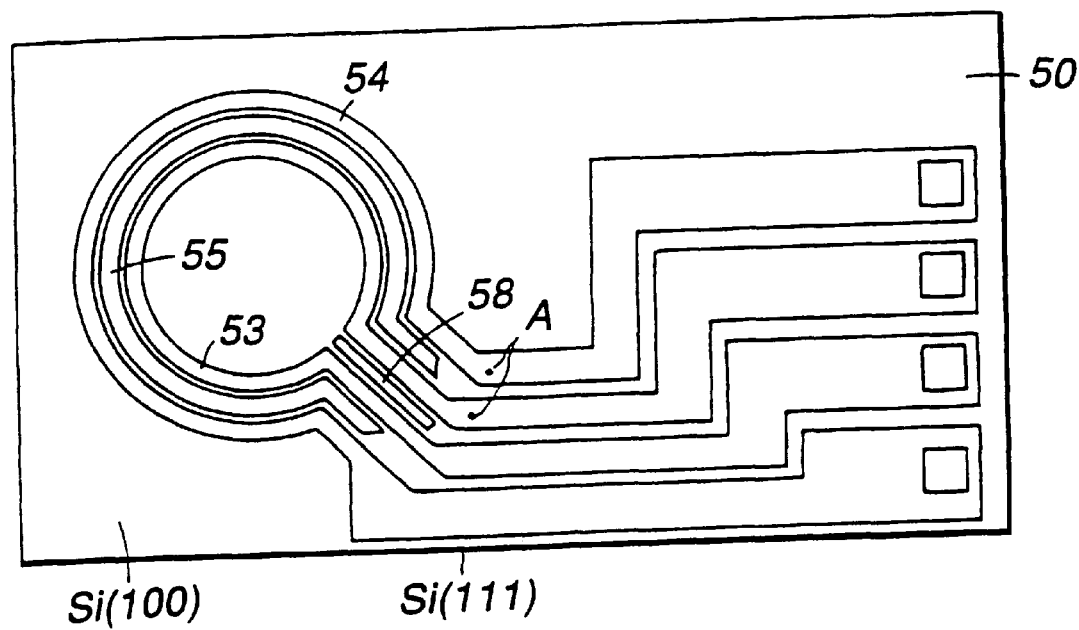
FIG. 19 is a view showing, by way of example, a pattern layout when using a silicone (100) substrate.

FIG. 19 shows an example of an arrangement of patterns on a silicon (100) substrate 50. As shown in FIG. 19, a lead pattern from a concentric circle is mounted at 45° to the plane face Si(111). A through-hole and a cavity is formed by etching the substrate Si through a hole 58 in order not to leave a residue of plane face (111) around the hole 58. Consequently, the lead pattern is separated from the substrate which may prevent heat loss when the heat is being transferred to the substrate. This improves the heat's distribution, heat transfer efficiency and durability of the sensor. While there are shown separated electrode leads, it is also possible to form a commonly usable short-circuit between one end of the heat-receiving element and one end of the heating element. This can be made by connecting wiring patterns on the substrate. For example, portions A and B of the wiring patterns shown in FIG. 19 are connected with each other as shown in FIG. 20. Accordingly, the quantity of leading electrodes may be reduced to three pieces as shown in FIG. 20.

FIGS. 21(a) and 21(b) are views for explaining another embodiment of the present invention. FIG. 21(a) is a plane view and FIG. 21(b) is a sectional view taken on line 21B—21B of FIG. 21(a). Components similar in function to those of the embodiment shown in FIGS. 17(a), 17(b) and 17(c) are denoted by the same reference characters used therein. In this embodiment, a number of flow rectifying plates 62 are arranged radially around a throttling hole 61 of a throttling plate 60 to reduce deviation of heat transfer. These flow rectifying plates can be disposed on the sensor substrate.

As shown in FIGS. 21(a) and 21(b), it is also possible to achieve further reduction of the flow deviation by providing a flow rectifying cone 59 opposite the center of the throttling hole 61.

FIG. 22 is a plane view for explaining an alternate embodiment of a throttling plate 60, which has a throttling hole 61 having notches or projections 61' radially formed thereat for uniformly adjusting the gas's flow.

FIGS. 23(a) and 23(b) show an example of a modification of the flow-rectifying cone 59 shown in FIGS. 21(a) and 21(b). FIG. 23(a) is a top plane view of the flow-rectifying plate 60 and FIG. 23(b) is a sectional side view of said plate. The provision of the rotary vane-type flow rectifying cone 59 assures obtaining a further uniform distribution of the flow rate.

Figure 24A:
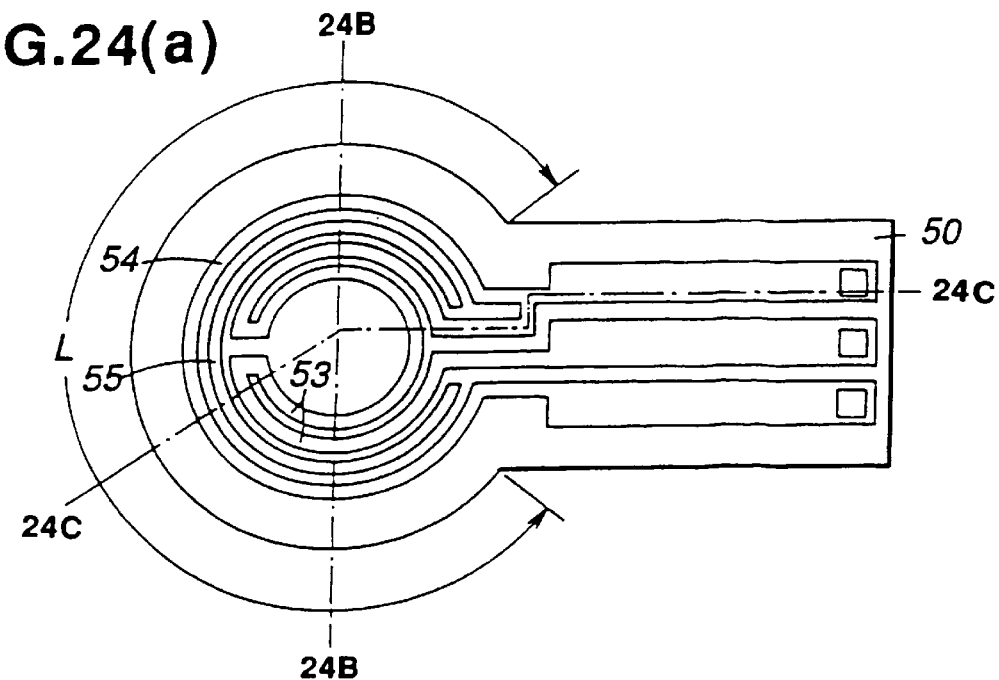
FIGS. 24(*a*), 24(*b*) and 24(*c*) are construction views of another embodiment of the present invention.
Figure 24B:
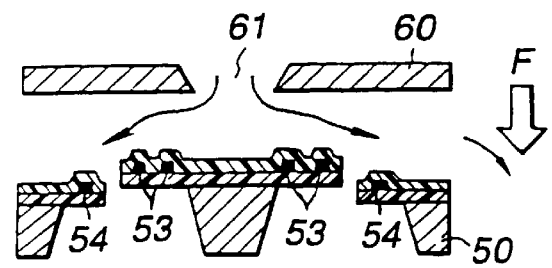
Figure 24C:
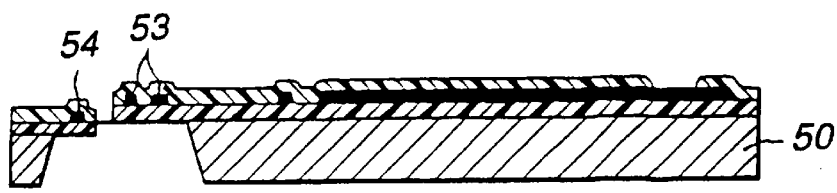

FIGS. 24(a), 24(b) and 24(c) are views for explaining another embodiment of the present invention. FIG. 24(a) is a plane view, FIG. 24(b) is a sectional view taken on the plane of the line 24B—24B of FIG. 24(a) and FIG. 24(c) is a sectional view taken on the plane of the line 24C—24C of FIG. 24(a) wherein a flow rectifying plate is omitted for clarification. Components similar in function to those of the embodiment shown in FIGS. 17(a), 17(b) and 17(c) are denoted by the same reference characters used therein.

This embodiment is characterized in that a heating portion 53 is of a double-circular type; a part of the electrodes of the heating portion and a heat-receiving (sensing) portion is used as a common electrode; a part (L) of a sensor substrate is in a circular form; and the heating layer 53 and the heat-receiving (sensing) layer 54 are formed at different levels. Especially, the application of the substrate being partially circular is effective to adjust the gas flow more uniformly and the employment of a throttling plate 60, having sizes substantially corresponding to those of the substrate (some difference may be allowed), forces the gas to pass through its throttle hole 61 and then to evenly flow along the substrate by the sucking-out effect of the gas flow along its outside.

Figure 25:
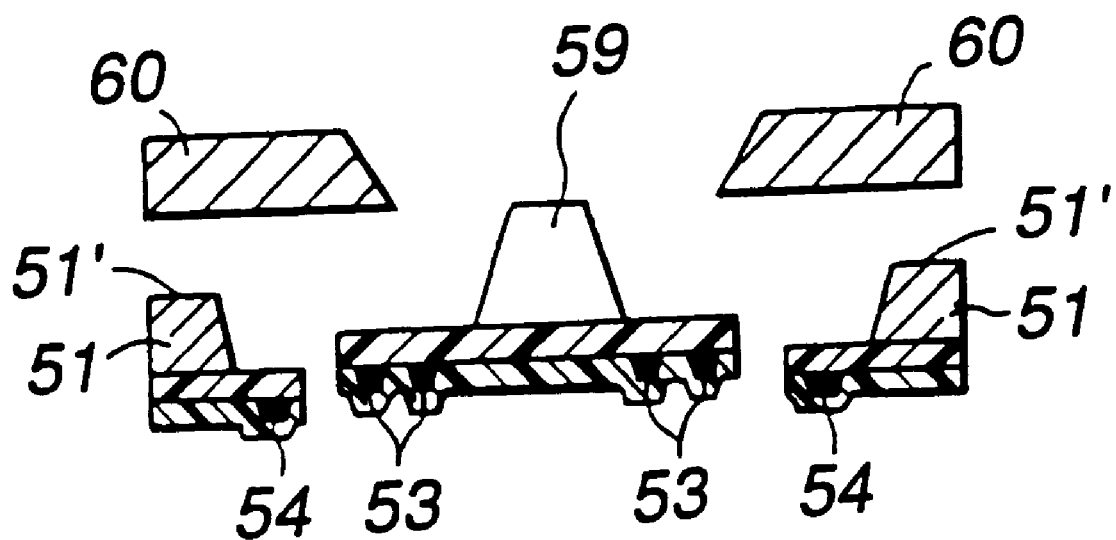
FIG. 25 is a construction plane view for explaining a modification of the embodiment shown in FIG. 24.

FIG. 25 shows a modified embodiment of the flow sensor shown in FIGS. 24(a), 24(b) and 24(c). The modified sensor is featured by that of a tapered portion 59, formed by etching at the center of a substrate 56, serves as a flow rectifying element capable of effectively diffusing the gas flow. The circumferential portion 51' of the substrate, which is formed by etching to be thinner than the center portion, is effective to adjust the gas flow smoothly. It is convenient that the flow-rectifying portion can be formed integrally with the substrate.

As apparent from the foregoing, the present invention provides:

a flow sensor which has an improved efficiency of heat transfer from a heating element to a heat receiving (sensing) element by placing the heating element and the heat-receiving element under the substrate so as not to allow the dissipation of heat from the heating element through convection (the ascending flow of gas); a flow sensor, wherein a heat receiving (sensing) element is disposed at a level higher than the heating element or two heat receiving elements in two stages at different levels, respectively, higher and lower than a heating element to effectively transfer heat from the heating element to the heat receiving element or elements, even if the heat from the heating element ascends or is diffused by the gas flow to be measured; a flow sensor having an improved efficiency of heat transfer with a uniform gas flow rate, wherein an open outlet portion of a gas passage is formed to expand forward and be shorter at both sides than its center line portion to reduce the passage's resistance against gas flow along the side walls of the open outlet portion lower than that of gas flow along the passage's center line;

a flow sensor having an improved efficiency of heat transfer, wherein a heat-receiving (sensing) element is disposed near an open outlet portion of a gas passage to prevent gas from flowing above the heat-receiving element i,e, from flowing upward;

a flow sensor wherein a flow-rectifying plate is provided at the outlet of the gas passage in order to stabilize the flow of gas along the outlet end of a substrate;

a flow sensor, wherein a heating portion and a heat-receiving portion are formed as coaxial rings to improve the efficiency of heat transfer there-between; and a flow sensor wherein a flow-rectifying plate is provided to obtain a uniform flow of gas along a heating portion and a heat receiving (sensing) portion, thereby increasing the efficiency of heat transfer there-between.

What is claimed is:

1. A flow sensor comprising a substrate having a cavity therein, a heating layer portion and a heat-sensing layer portion, said portions formed each in the form of a bridge across the cavity and supported at both ends or at one end on the substrate in said order in the direction of a flow of gas to be measured, wherein a silicon (100) wafer is used as the substrate and the cavity has saw-toothed side walls, each of which is formed by anisotropically etching out and each surface of a saw-toothed plane is parallel to a (111) plane and each subsequent vertical back face is perpendicular to the (111) plane, and wherein the heat-sensing layer portion is disposed near an open end of an outlet portion of the cavity.

2. A flow sensor as recited in claim 1, wherein an open end of the cavity's outlet portion is formed to expand outward in width.

3. A flow sensor as recited in claim 1, further comprising a flow rectifying plate disposed at an open end of the cavity's outlet portion.

4. A flow sensor as recited in claim 1, wherein the flow sensor is secured integrally to a front inclined surface of a wedge-shaped stand.

5. A flow sensor comprising a substrate having a cavity therein, a heating layer portion and a heat-sensing layer portion, said portions formed each in the form of a bridge across the cavity and supported at both ends or at one end on the substrate in said order in the direction of a flow of gas to be measured, wherein a silicon (100) wafer is used as the substrate and the cavity has saw-toothed side walls, each of which is formed by anisotropically etching out the walls such that a first set of walls forming the saw-toothed side walls are parallel to each other and a (111) plane and a second set of walls forming the saw-toothed walls are perpendicular to the first set of walls and the (111) plane and parallel to each other, wherein the heat-sensing layer portion is disposed neat an open end of an outlet portion of the cavity.

6. A flow sensor comprising a substrate having a cavity therein, a heating layer portion and a heat-sensing layer portion, said portions formed each in the form of a bridge across the cavity and supported at both ends or at one end on the substrate in said order in the direction of a flow of gas to be measured, wherein a silicon (100) wafer is used as the substrate and the cavity has saw-toothed side walls, each of which is formed by anisotropically etching out the walls such that a first set of walls forming the saw-toothed side walls are parallel to each other and a (111) plane and a second set of walls forming the saw-toothed walls are at angles to the first set of walls perpendicular to the (111) plane and parallel to each other, wherein the heat-sensing layer portion is disposed near an open end of an outlet portion of the cavity.

* * * * *

UNITED STATES PATENT AND TRADEMARK OFFICE
CERTIFICATE OF CORRECTION

PATENT NO.   : 6,112,591
DATED        : September 5, 2000
INVENTOR(S)  : Junji Manaka It is certified that error appears in the above-identified patent and that said Letter Patent is hereby corrected as shown below:

Cover page, item [62], lines 5 and 6, please change "08/702,779, Aug. 23, 1996, Pat. No. 5,780,393" to --08/072,779, Jun. 7, 1993, Pat. No. 5,392,647--.

Signed and Sealed this

Eighth Day of May, 2001

*Attest:*

NICHOLAS P. GODICI

*Attesting Officer*    *Acting Director of the United States Patent and Trademark Office*